US012566295B2

(12) United States Patent
Lo et al.

(10) Patent No.: US 12,566,295 B2
(45) Date of Patent: Mar. 3, 2026

(54) PHOTONIC INTEGRATED CIRCUIT STRUCTURE AND FABRICATION METHOD THEREOF

(71) Applicant: Vanguard International Semiconductor Corporation, Hsinchu (TW)

(72) Inventors: Ming-Cheng Lo, New Taipei (TW); Jui-Chun Chang, Hsinchu (TW); Shih-Chang Huang, Hsinchu (TW); Wu-Hsi Lu, Hsinchu (TW); Yu-Che Tsai, Hsinchu (TW); Shih-Hao Liu, Taoyuan (TW); Yen-Shih Ho, Taoyuan (TW)

(73) Assignee: Vanguard International Semiconductor Corporation, Hsinchu (TW)

( * ) Notice: Subject to any disclaimer, the term of this patent is extended or adjusted under 35 U.S.C. 154(b) by 242 days.

(21) Appl. No.: 18/240,355

(22) Filed: Aug. 31, 2023

(65) Prior Publication Data

US 2025/0076580 A1     Mar. 6, 2025

(51) Int. Cl.
*G02B 6/136* (2006.01)
*G02B 6/132* (2006.01)
*G02B 6/12* (2006.01)

(52) U.S. Cl.
CPC ............. *G02B 6/136* (2013.01); *G02B 6/132* (2013.01); *G02B 2006/12061* (2013.01); *G02B 2006/12104* (2013.01); *G02B 2006/12147* (2013.01)

(58) Field of Classification Search
CPC .................................................... G02B 6/4214
See application file for complete search history.

(56) References Cited

U.S. PATENT DOCUMENTS

| | | | |
|---|---|---|---|
| 5,195,150 A * | 3/1993 | Stegmueller | ......... G02B 6/4204 |
| | | | 385/33 |
| 6,965,714 B2 | 11/2005 | Brock | |
| 9,658,396 B2 | 5/2017 | Rong | |
| 10,996,408 B2 | 5/2021 | Heck | |
| 2002/0071636 A1* | 6/2002 | Bazylenko | ........... G02B 6/4214 |
| | | | 385/52 |

FOREIGN PATENT DOCUMENTS

| | | |
|---|---|---|
| CN | 104797963 B | 12/2018 |
| CN | 111221076 A | 6/2020 |
| CN | 114966962 A | 8/2022 |
| TW | I582478 B | 5/2017 |

OTHER PUBLICATIONS

Nambiar, "Grating-Assisted Fiber to Chip Coupling for SOI Photonic Circuits", Appl. Sci. 2018, 8(7), 1142, Jul. 13, 2018.
Han, "Grating Coupler Design for Vertical Light Coupling in Silicon Thin Films on Lithium Niobate", Crystals 2020, 10(9), 850, Sep. 22, 2020.

* cited by examiner

*Primary Examiner* — Chad H Smith
(74) *Attorney, Agent, or Firm* — Winston Hsu

(57)     ABSTRACT

A photonic integrated circuit structure includes a semiconductor substrate. A waveguide is disposed above the semiconductor substrate and has an inclined plane. A mirror coating layer is conformally disposed on the inclined plane. A cladding layer covers the waveguide and the mirror coating layer. A hole is disposed in the semiconductor substrate or the cladding layer, and the hole overlaps the inclined plane in a vertical direction. In addition, an optical fiber is disposed in the hole to receive a reflected light from the mirror coating layer.

17 Claims, 10 Drawing Sheets

PHOTONIC INTEGRATED CIRCUIT STRUCTURE AND FABRICATION METHOD THEREOF

BACKGROUND OF THE INVENTION

1. Field of the Invention

The present disclosure relates generally to photonic integrated circuits, and more particularly to photonic integrated circuit structures including a waveguide having an inclined plane reflector at its end and fabrication methods thereof.

2. Description of the Prior Art

Photonic integrated circuits (PICs) are integrated circuits with optical functions. In PICs, various optical components such as modulators, optical couplers, switches, etc. are directly fabricated on a chip by using semiconductor manufacturing processes. PICs mainly use photons for signal transmission and calculation, and use waveguides to connect various optical components. Electronic integrated circuits (EICs) generally use electrons to transmit signals and perform calculations, and use copper wires to connect various components. Compared with electrons, photons are suitable for wider bandwidth and have faster data transmission speed, which can provide higher transmission rate, large amount of data transmission and better communication quality for computing, transmission and sensing industries.

In PICs, optical couplers are used to read the data stored on the chip. The optical couplers usually have two types of a grating coupler and an edge coupler. For the edge coupler, the design is simple, and the usable bandwidth is wider than that of the grating coupler. The optical loss of the edge coupler is low, but the splitting surface of the edge coupler needs to be polished to have better optical coupling efficiency, which makes the process of manufacturing the edge coupler more complicated. As far as the grating coupler is concerned, its operating bandwidth is narrow, and the optical loss may be large. Although the process of manufacturing the grating coupler is simpler than that of the edge coupler, the grating coupler still needs to set the optical fiber at a specific angle and a specific position to obtain better and strong light signals.

SUMMARY OF THE INVENTION

In view of this, the present disclosure provides photonic integrated circuit structures and fabrication methods thereof. The photonic integrated circuit structures include a waveguide having an inclined plane reflector at its end to replace the grating coupler, so that the usable bandwidth is wider. Moreover, in the photonic integrated circuit structures of the present disclosure, the position of the optical fiber is precise, thereby obtaining strong optical signals without adjusting the optical fiber at a specific angle. According to the photonic integrated circuit structures of the present disclosure, the optical coupling efficiency is high and the optical loss is low, which is conducive to provide higher transmission rate, larger amount of data transmission and better communication quality. In addition, the size of the inclined plane reflector at the end of the waveguide is much smaller than the size of the grating coupler, which is beneficial to the miniaturization of photonic integrated circuits.

According to an embodiment of the present disclosure, a photonic integrated circuit structure is provided and includes a semiconductor substrate, a waveguide, a mirror coating layer, a cladding layer, a hole, and an optical fiber. The waveguide is disposed above the semiconductor substrate and has an inclined plane. The mirror coating layer is conformally disposed on the inclined plane of the waveguide. The cladding layer is disposed to cover the waveguide and the mirror coating layer. The hole is disposed in the semiconductor substrate or the cladding layer, and the hole overlaps with the inclined plane of the waveguide in a vertical direction. In addition, the optical fiber is disposed in the hole to receive a reflected light from the mirror coating layer.

According to an embodiment of the present disclosure, a method of fabricating a photonic integrated circuit is provided and includes the following steps. A semiconductor substrate is provided. A waveguide is formed above the semiconductor substrate and has an inclined plane. A mirror coating layer is conformally formed on the inclined plane of the waveguide. A cladding layer is formed to cover the waveguide and the mirror coating layer. A hole is formed in the semiconductor substrate or the cladding layer, where the hole overlaps with the inclined plane of the waveguide in a vertical direction. In addition, an optical fiber is provided to place in the hole to receive a reflected light from the mirror coating layer.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Aspects of the present disclosure are best understood from the following detailed description when read with the accompanying figures. It is noted that, in accordance with the standard practice in the industry, various features may not be drawn to scale. In fact, the dimensions of the various features may be arbitrarily increased or reduced for clarity of discussion.

FIG. 3, FIG. 4, FIG. 5 and FIG. 6 are schematic cross-sectional views and schematic plan views of some stages of a method of fabricating a photonic integrated circuit according to an embodiment of the present disclosure.

DETAILED DESCRIPTION

Figure 1:
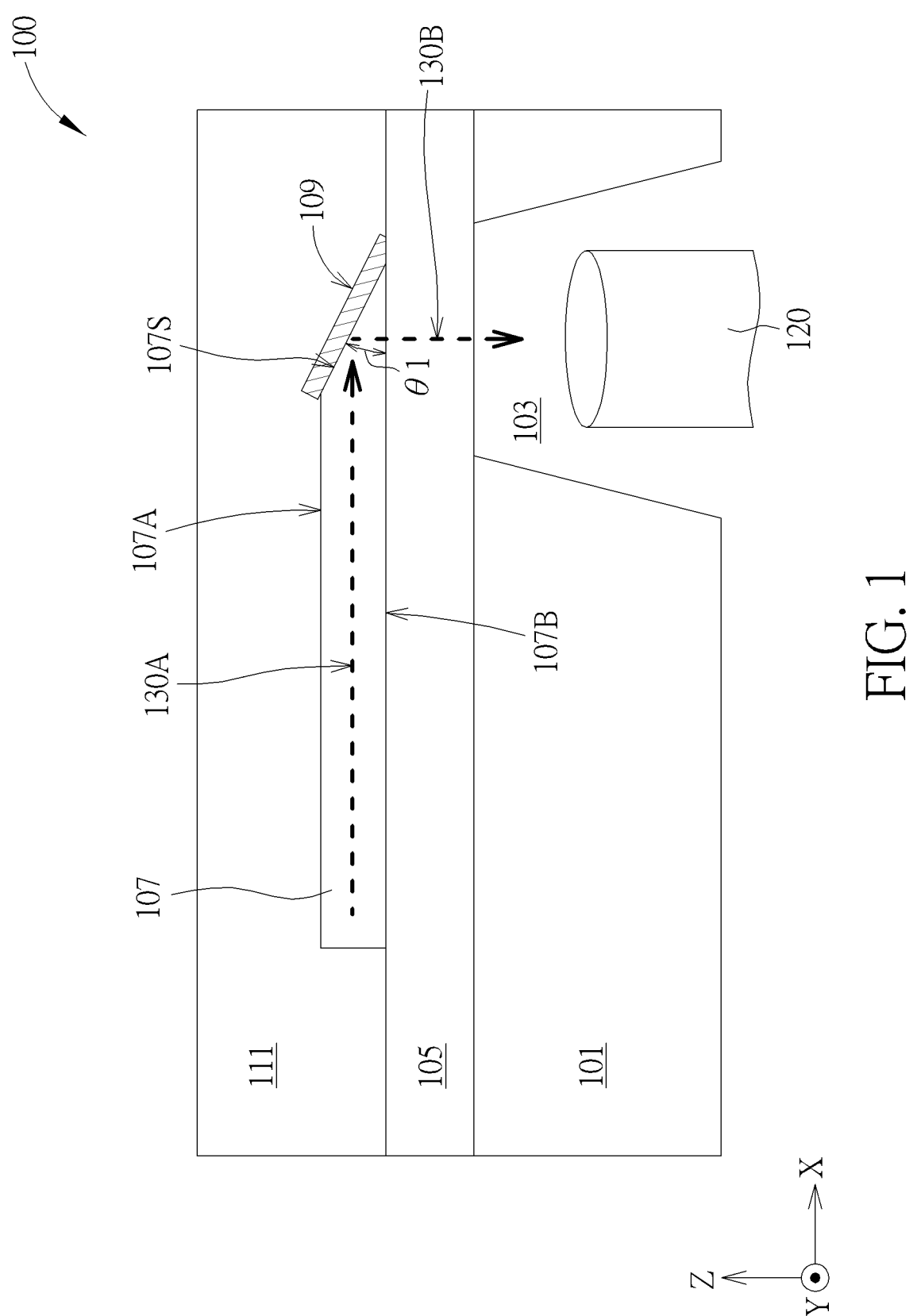
FIG. 1 is a schematic cross-sectional view of a photonic integrated circuit structure according to an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "under," "lower," "over," "above," "on," "upper" and the like, may be used herein for ease of description to describe one element or feature's relationship to another element(s) or feature(s) as illustrated in the figures. The spatially relative terms are intended to encompass different orientations of the photonic integrated circuits in use or operation in addition to the orientation depicted in the figures. For example, if the photonic integrated circuits in the figures are turned over, elements described as "below" and/or "beneath" other elements or features would then be oriented "above" and/or "over" the other elements or features. The apparatus may be otherwise oriented (rotated 90 degrees or at other orientations) and the spatially relative descriptors used herein may likewise be interpreted accordingly.

It is understood that, although the terms first, second, third, etc. may be used herein to describe various elements, components, regions, layers and/or sections, these elements, components, regions, layers and/or sections should not be limited by these terms. These terms may be only used to distinguish one element, component, region, layer and/or section from another region, layer and/or section. Terms such as "first," "second," and other numerical terms when used herein do not imply a sequence or order unless clearly indicated by the context. Thus, a first element, component, region, layer and/or section discussed below could be termed a second element, component, region, layer and/or section without departing from the teachings of the embodiments.

As disclosed herein, the term "about" or "substantial" generally means within 20%, 10%, 5%, 3%, 2%, 1%, or 0.5% of a given value or range. Unless otherwise expressly specified, all of the numerical ranges, amounts, values and percentages disclosed herein should be understood as modified in all instances by the term "about" or "substantial". Accordingly, unless indicated to the contrary, the numerical parameters set forth in the present disclosure and attached claims are approximations that can vary as desired.

In the present disclosure, a "compound semiconductor" refers to a group III-V compound semiconductor that includes at least one group III element and at least one group V element, where group III element may be boron (B), aluminum (Al), gallium (Ga) or indium (In), and group V element may be nitrogen (N), phosphorous (P), arsenic (As), or antimony (Sb). Furthermore, the group III-V semiconductor may refer to, but not limited to, gallium nitride (GaN), indium phosphide (InP), aluminum arsenide (AlAs), gallium arsenide (GaAs), aluminum gallium nitride (AlGaN), indium aluminum gallium nitride (InAlGaN), indium gallium nitride (InGaN), aluminum nitride (AlN), gallium indium phosphide (GaInP), AlGaAs, InAlAs, InGaAs, or the like, or the combination thereof. Besides, based on different requirements, compound semiconductor may contain dopants to become semiconductor with specific conductivity type, such as n-type or p-type.

Although the disclosure is described with respect to specific embodiments, the principles of the disclosure, as defined by the claims appended herein, can obviously be applied beyond the specifically described embodiments of the disclosure described herein. Moreover, in the description of the present disclosure, certain details have been left out in order to not obscure the inventive aspects of the disclosure. The details left out are within the knowledge of a person having ordinary skill in the art.

The present disclosure is directed to photonic integrated circuit structures and fabrication methods thereof. The photonic integrated circuit structures include a waveguide having an inclined plane at its end, and a mirror coating layer is disposed on the inclined plane to produce an inclined plane reflector. The inclined plane reflector can replace a grating coupler, so that the usable bandwidth is wider without wavelength dependence. Moreover, according to the photonic integrated circuit structures of the present disclosure, the alignment of an optical fiber is precise, and there is no need to adjust the optical fiber at a specific angle, such that strong optical signals are obtained. Therefore, the optical coupling efficiency is improved and the optical loss is reduced. Furthermore, the angle of the inclined plane may be adjusted by an etching process according to various requirements of the photonic integrated circuit structures. The photonic integrated circuit structures of the present disclosure provide higher transmission rate, larger amount of data transmission and better optical transmission quality. In addition, the size of the inclined plane at the end of the waveguide is much smaller than the size of the grating coupler, which is beneficial to the miniaturization of photonic integrated circuits.

FIG. 1 is a schematic cross-sectional view of a photonic integrated circuit (PIC) structure 100 according to an embodiment of the present disclosure. The PIC structure 100 includes a semiconductor substrate 101 having a hole 103 for placing an optical fiber 120 so that the optical fiber 120 is precisely aligned with an inclined plane of a waveguide. In some embodiments, the composition of the semiconductor substrate 101 may be silicon (Si), germanium (Ge) or a group III-V compound semiconductor, such as indium phosphide (InP), gallium arsenide (GaAs), etc., but not limited thereto. A waveguide 107 is disposed above the semiconductor substrate 101, and the waveguide 107 has an inclined plane 107S at its one end. The inclined plane 107S is vertically corresponding to the hole 103 in a vertical direction (for example, an Z-axis direction). The bottom surface 107B of the waveguide 107 is close to the semiconductor substrate 101, and the top surface 107A of the waveguide 107 is away from the semiconductor substrate 101. In this embodiment, an angle $\theta 1$ between the inclined plane 107S and the bottom surface 107B of the waveguide 107 may be greater than 0 degrees to about 45 degrees. Within this range of the angle $\theta 1$, the light transmitted in the waveguide 107 is reflected by a mirror coating layer 109 on the inclined plane 107S and transmitted downward to the optical fiber 120. In some embodiments, the composition of the waveguide 107 may be silicon (Si), silicon nitride (SiN), germanium (Ge) or a group III-V compound semiconductor, such as indium phosphide (InP), gallium arsenide (GaAs), etc., but not limited thereto. The mirror coating layer 109 is conformally disposed on the inclined plane 107S. In some embodiments, the composition of the mirror coating layer 109 may be a metal such as aluminum (Al), silver (Ag), etc., or a distributed Bragg reflector (DBR) coating material, which is a multilayered film stacked by materials with different refractive indices. The thickness of the mirror coating layer 109 may be about 100 angstroms (Å) to about 10000 Å, but not limited thereto. The thickness of the mirror coating layer 109 may be adjusted according to the sizes of the waveguide 107.

In addition, the PIC structure 100 includes an insulating layer 105 disposed between the semiconductor substrate 101 and the waveguide 107. The refractive index of the insulating layer 105 is lower than that of the waveguide 107, so that the light in the waveguide 107 generate total internal reflection. In some embodiments, the insulating layer 105 is, for example, a buried oxide layer (BOX), and its composition may be silicon oxide. In one embodiment, the waveguide 107, the insulating layer 105 and the semiconductor substrate 101 may be formed of a semiconductor on insulator (SOI) substrate. Moreover, the depth of the hole 103 may be controlled by an etching process of forming the hole 103, so that the bottom surface of the hole 103 may be located at the interface between the semiconductor substrate 101 and the insulating layer 105, located in the insulating layer 105, or located in the semiconductor substrate 101. The PIC structure 100 further includes a cladding layer 111 to cover the waveguide 107 and the mirror coating layer 109, and the cladding layer 111 is in contact with the surface of the insulating layer 105. The refractive index of the cladding layer 111 is lower than that of the waveguide 107. In one embodiment, the cladding layer 111 is, for example, an inter-metal dielectric (IMD) layer. The composition of the cladding layer 111 may be silicon oxide. In this embodiment, an incident light 130A is transmitted in the waveguide 107 along an X-axis direction, and a reflected light 130B reflected by the mirror coating layer 109 is transmitted downwards along a Y-axis direction, so that the reflected light 130B from the mirror coating layer 109 is received by the optical fiber 120 disposed in the hole 103.

According to an embodiment of the present disclosure, the hole 103 in the semiconductor substrate 101 may be formed by photolithography and etching processes, and the inclined plane 107S of the waveguide 107 is also formed by photolithography and etching processes. The position of the hole 103 and the position of the inclined plane 107S are precisely controlled by these photolithography and etching processes, so that the hole 103 overlaps with the inclined plane 107S of the waveguide 107 in the vertical direction. The optical fiber 120 disposed in the hole 103 is precisely aligned with the mirror coating layer 109 on the inclined plane 107S, thereby improving the optical coupling efficiency. Moreover, the optical fiber 120 disposed in the hole 103 also reduces the light loss. In addition, the angle θ1 between the inclined plane 107S and the bottom surface 107B of the waveguide 107 may be adjusted by the etching process according to the position of the optical fiber 120, thereby further improving the light coupling efficiency.

In the grating coupler, the wavelength is varied depending on the grating periods, so that the optical coupling efficiency of the grating coupler is low, and the usable bandwidth of the grating coupler is narrow. According to the embodiments of the present disclosure, there is the inclined plane 107S at the end of the waveguide 107, and the mirror coating layer 109 is provided on the inclined plane 107S to reflect the light, so that the optical coupling has no wavelength dependence and is not affected by the wavelength. Accordingly, in the PIC structures of the present disclosure, the optical coupling efficiency is improved, and the usable bandwidth is wider than that of the grating coupler. Therefore, the PIC structures of the present disclosure provide higher transmission rate, larger amount of data transmission and better optical transmission quality. Furthermore, when viewed from a top view, the width of the inclined plane 107S may be substantially the same as the width of other portions of the waveguide 107. In some embodiments, in the Y-axis direction, the width of the inclined plane 107S may be about 0.1 micrometers (μm)

to about 2 μm. For the grating coupler, the required grating width is about 20 μm, and the required grating length is about 15 μm. According to the embodiments of the present disclosure, the size of the inclined plane reflector at the end of the waveguide is much smaller than the size of the grating coupler, which is conducive to the miniaturization of photonic integrated circuits.

Figure 2:
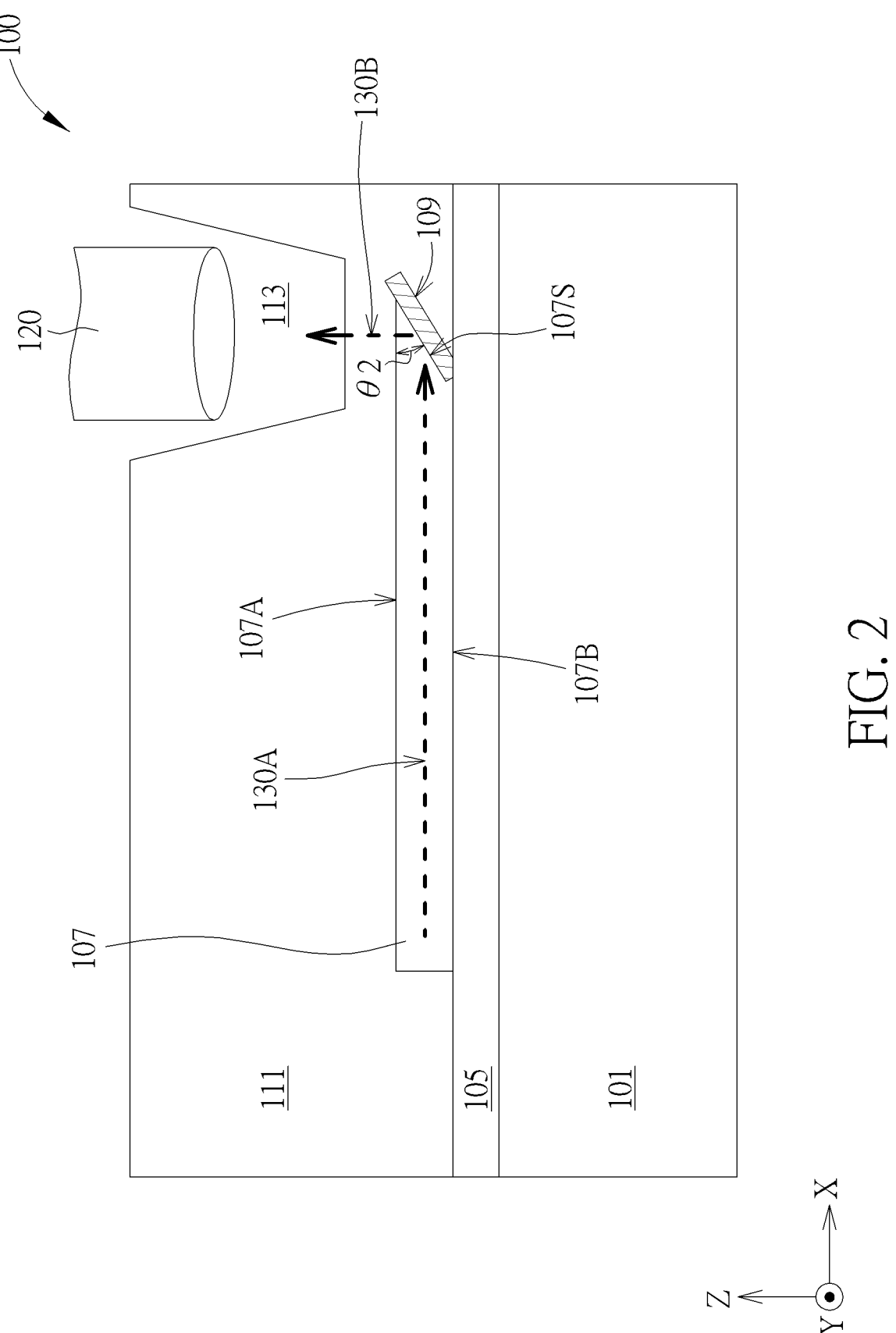
FIG. 2 is a schematic cross-sectional view of a photonic integrated circuit structure according to another embodiment of the present disclosure.

FIG. 2 is a schematic cross-sectional view of a PIC structure 100 according to another embodiment of the present disclosure. The PIC structure 100 includes a semiconductor substrate 101. A waveguide 107 is disposed above the semiconductor substrate 101, and has an inclined plane 107S. A mirror coating layer 109 is conformally disposed on the inclined plane 107S. The bottom surface 107B of the waveguide 107 is close to the semiconductor substrate 101, and the top surface 107A of the waveguide 107 is away from the semiconductor substrate 101. In this embodiment, an angle θ2 between the inclined plane 107S and the top surface 107A of the waveguide 107 may be greater than 0 degrees to about 45 degrees, so that the light transmitted in the waveguide 107 is reflected by the mirror coating layer 109 on the inclined plane 107S and transmitted upward to an optical fiber 120.

The PIC structure 100 also includes a cladding layer 111 to cover the waveguide 107 and the mirror coating layer 109. In this embodiment, the cladding layer 111 has a hole 113 vertically corresponding to the inclined plane 107S, and the bottom surface of the hole 113 is located in the cladding layer 111. The refractive index of the cladding layer 111 is lower than that of the waveguide 107, so that the light in the waveguide 107 generate total internal reflection. The cladding layer 111 may be an inter-metal dielectric (IMD) layer. In this embodiment, the optical fiber 120 is disposed in the hole 113 of the cladding layer 111 to receive the reflected light from the mirror coating layer 109. In addition, the PIC structure 100 includes an insulating layer 105 disposed between the semiconductor substrate 101 and the waveguide 107. The refractive index of the insulating layer 105 is lower than that of the waveguide 107, so that the light in the waveguide 107 generate total internal reflection. The insulating layer 105 may be a buried oxide layer (BOX). The cladding layer 111 is in contact with the surface of the insulating layer 105 such that the waveguide 107 and the mirror coating layer 109 are both wrapped around by the cladding layer 111 and the insulating layer 105. In some embodiments, the waveguide 107, the insulating layer 105, and the semiconductor substrate 101 may be formed of a SOI substrate. The compositions of the semiconductor substrate 101, the waveguide 107, the mirror coating layer 109, the cladding layer 111 and the insulating layer 105 of the PIC structure 100 in FIG. 2, as well as the width of the inclined plane 107S and the thickness of the mirror coating layer 109 may refer to the aforementioned description of the PIC structure 100 in FIG. 1, and are not repeated here. In this embodiment, an incident light 130A is transmitted in the waveguide 107 along the X-axis direction, and a reflected light 130B reflected by the mirror coating layer 109 is transmitted upward along the Y-axis direction, so that the reflected light from the mirror coating layer 109 is received by the optical fiber 120 disposed in the hole 113.

According to an embodiment of the present disclosure, the hole 113 of the cladding layer 111 may be formed by photolithography and etching processes, and the inclined plane 107S of the waveguide 107 is also formed by photolithography and etching processes. Therefore, the position of the hole 113 and the position of the inclined plane 107S are precisely controlled by these photolithography and etching processes. The hole 113 overlaps with the inclined plane 107S of the waveguide 107 in the vertical direction, so that the optical fiber 120 disposed in the hole 113 is precisely aligned with the mirror coating layer 109 on the inclined plane 107S to improve the optical coupling efficiency. Moreover, the optical fiber 120 disposed in the hole 113 also reduce the light loss. In addition, an angle $\theta2$ between the inclined plane 107S and the top surface 107A of the waveguide 107 may be adjusted by the etching process according to the position of the optical fiber 120, thereby improving the light coupling efficiency. According to the embodiments of the present disclosure, there is the inclined plane 107S at the end of the waveguide 107, and the mirror coating layer 109 is provided on the inclined plane 107S to reflect the light, so that the optical coupling is not affected by the wavelength to improve the optical coupling efficiency, and the usable bandwidth is wider than that of the grating coupler. Therefore, according to the embodiments of the present disclosure, the PIC structure 100 provides higher transmission rate, larger amount of data transmission and better optical transmission quality. In addition, the size of the inclined plane 107S in the embodiments of the present disclosure is smaller than the size of the grating coupler, which is beneficial to the miniaturization of photonic integrated circuits.

Figure 3:
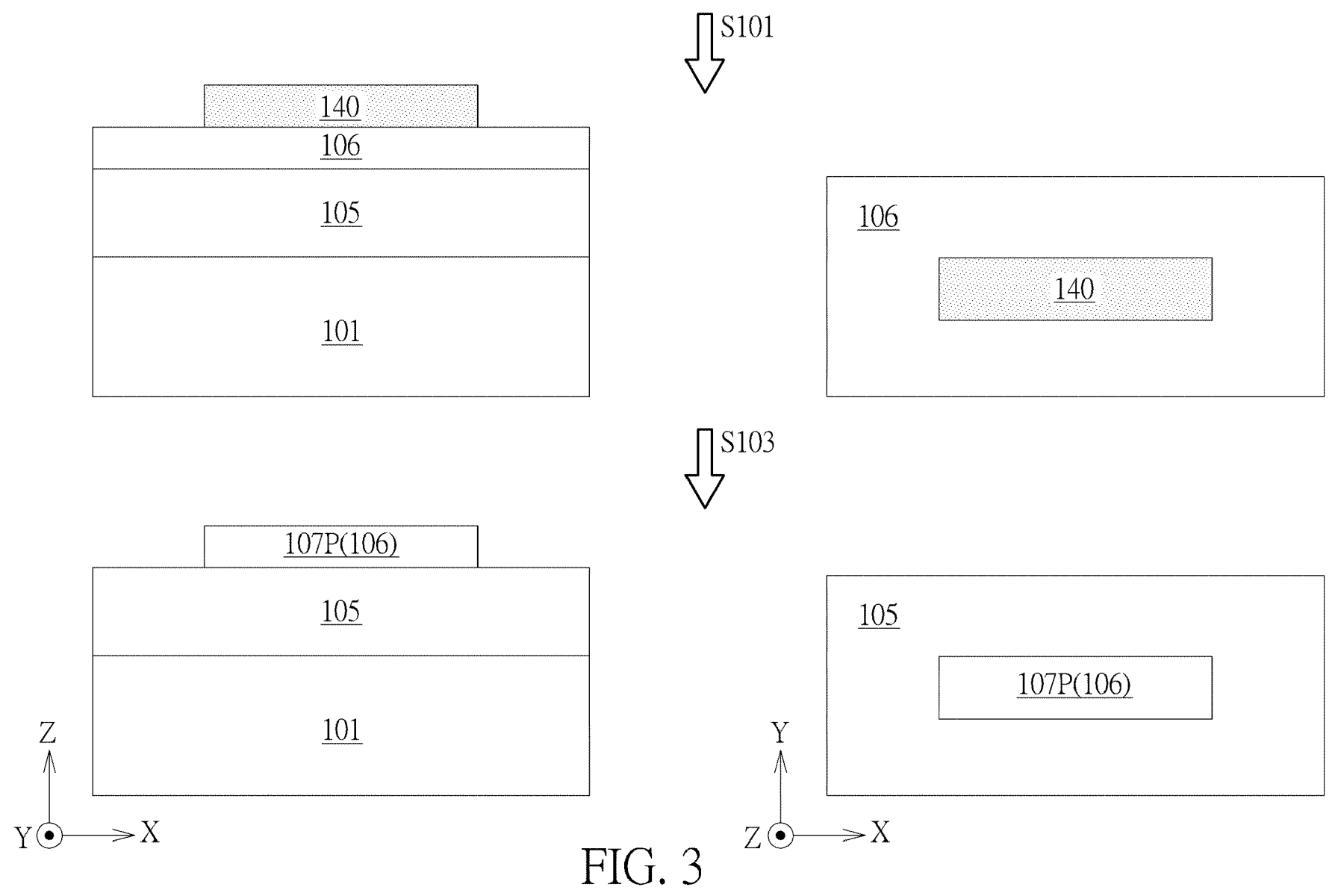
Figure 4:
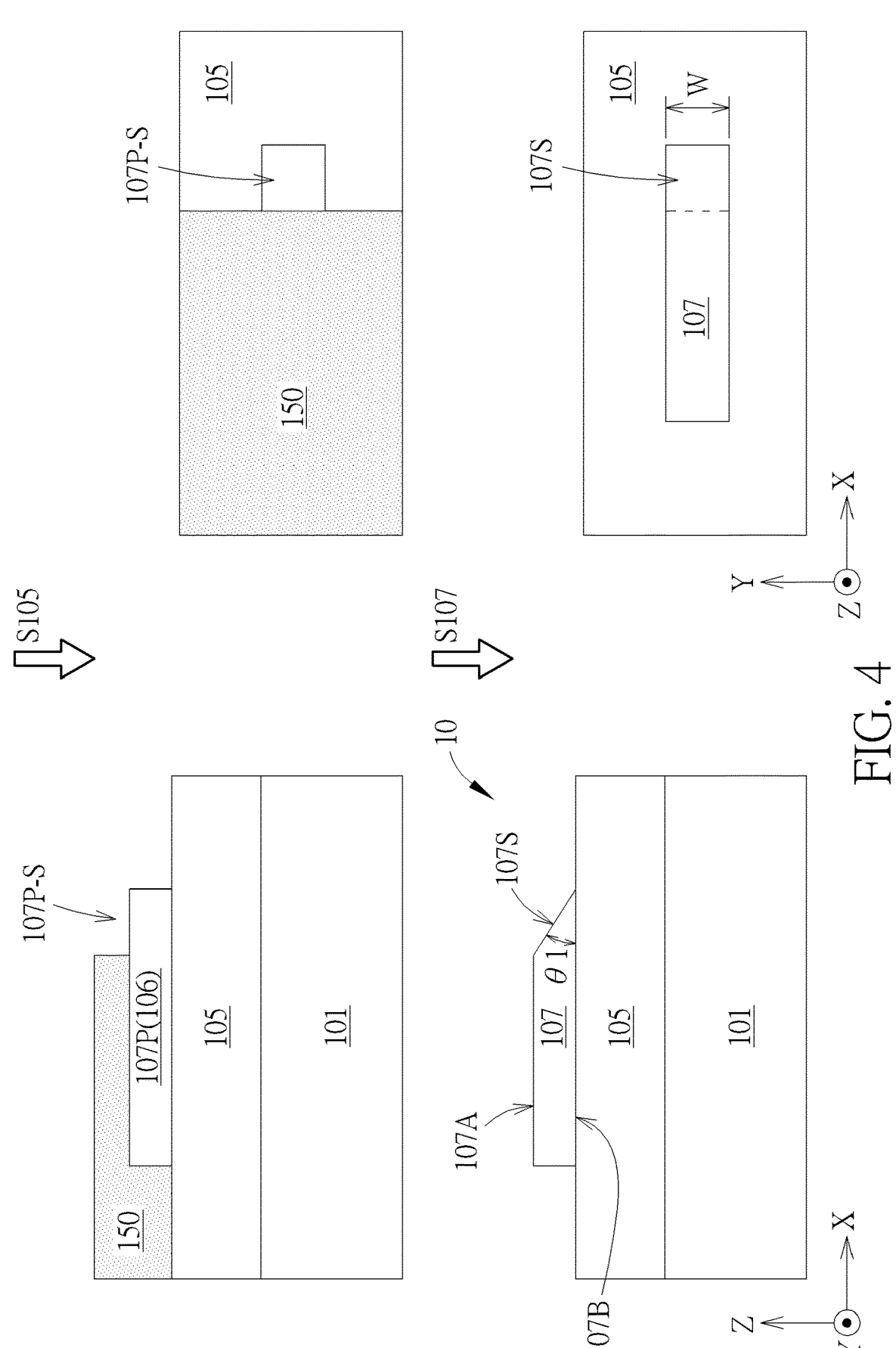
Figure 5:
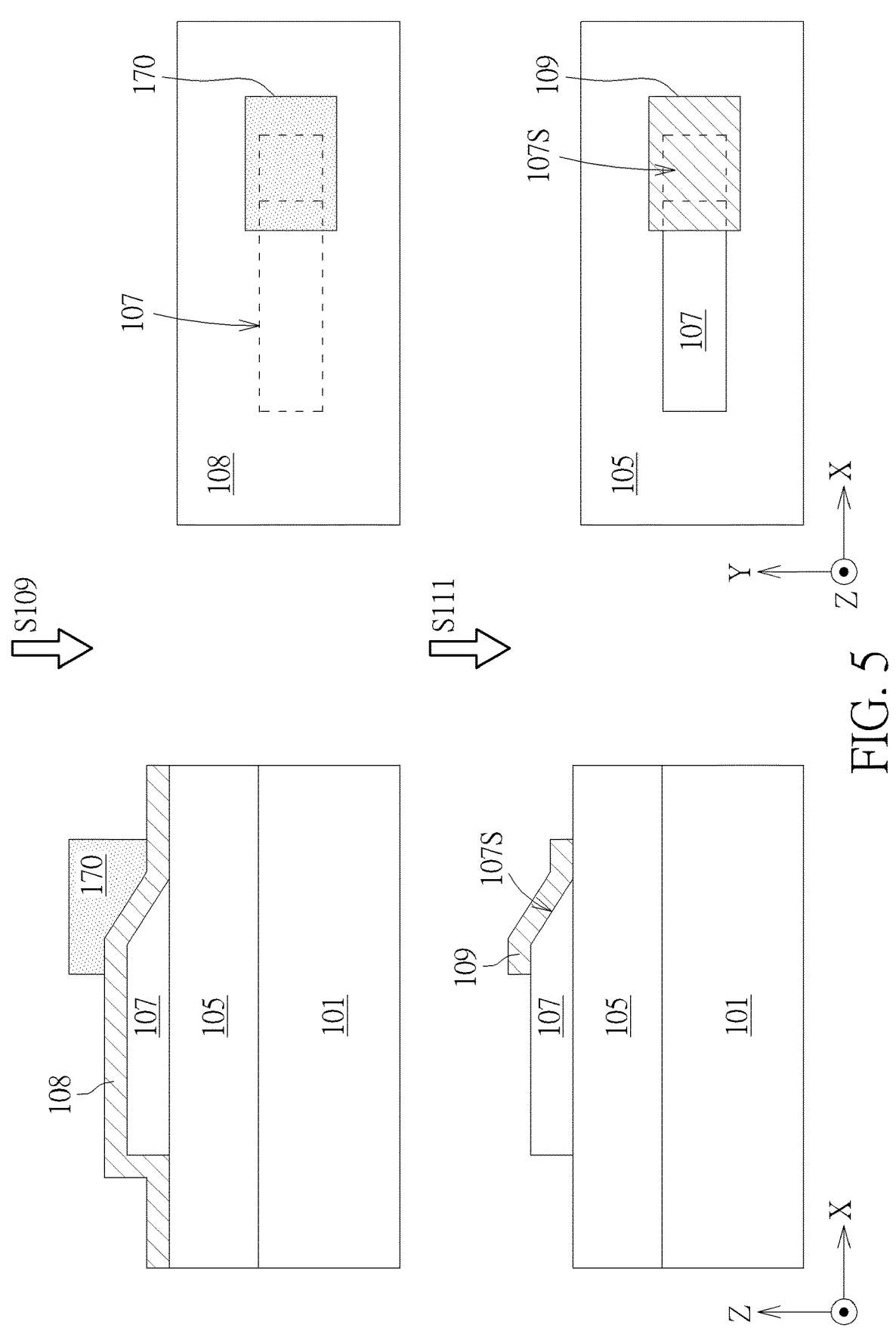

FIG. 3, FIG. 4, FIG. 5 and FIG. 6 are schematic cross-sectional views and schematic plan views of some stages of a method of fabricating a photonic integrated circuit according to an embodiment of the present disclosure, where FIG. 3, FIG. 4 and FIG. 5 show cross-sectional views and corresponding plan views of several steps. Referring to FIG. 3, in step S101, in one embodiment, firstly, a SOI substrate is provided and includes a semiconductor substrate 101, an insulating layer 105, and a waveguide material layer 106 stacked from bottom to top in sequence. The semiconductor substrate 101 is, for example, a silicon wafer, the insulating layer 105 is, for example, a buried oxide layer (BOX), and the waveguide material layer 106 is, for example, a silicon epitaxial layer, but not limited thereto. The semiconductor substrate 101 and the waveguide material layer 106 may be other suitable semiconductor materials. For example, the waveguide material layer 106 may be replaced by a silicon nitride layer.

Then, still in step S101, a mask 140 such as a patterned photoresist or a hard mask is formed on the waveguide material layer 106. The mask 140 covers a portion of the waveguide material layer 106 and another portion of the waveguide material layer 106 is exposed, as shown in the plan view. The portion of the waveguide material layer 106 covered by the mask 140 corresponds to an initial outline of a subsequently formed waveguide.

Next, still referring to FIG. 3, in step S103, an etching process is performed to pattern the waveguide material layer 106. The portion of the waveguide material layer 106 not covered by the mask 140 is removed. The portion of the waveguide material layer 106 covered by the mask 140 is remained to form an initial outline 107P of a waveguide. Thereafter, a stripping process such as ashing or soaking process is used to remove the mask 140.

Afterwards, referring to FIG. 4, in step S105, a mask 150 is formed on the insulating layer 105. The mask 150 is, for example, a patterned photoresist or a hard mask, which covers a portion of the initial outline 107P of the waveguide. Another portion of the initial outline 107P of the waveguide is exposed. As shown in the plan view, the portion of the initial outline 107P of the waveguide not covered by the mask 150 is a predetermined region 107P-S for a subsequently formed inclined plane.

Next, still referring to FIG. 4, in step S107, an etching process is performed to remove an upper portion of the initial outline 107P of the waveguide (also referred to as the waveguide material layer 106) in the predetermined region 107P-S, so as to form an inclined plane 107S of a waveguide 107. An angle $\theta1$ between the inclined plane 107S and the bottom surface 107B of the waveguide 107 is greater than 0 degrees to about 45 degrees. Thereafter, a stripping process is used to remove the mask 150. In some embodiments, a multi-step isotropic dry etching process, such as a plasma etching process, or a grayscale lithography technique may be used to etch the waveguide material layer 106 to form the inclined plane 107S. As shown in the plan view, in some embodiments, the width W of the inclined plane 107S may be the same as the width of other portions of the waveguide 107. The width W may be about 0.1 μm to about 2 μm, but not limited thereto. The width W may be adjusted according to the size of the waveguide 107.

Afterwards, referring to FIG. 5, in step S109, a mirror coating material layer 108 is conformally deposited on the insulating layer 105 and the waveguide 107. The mirror coating material layer 108 is conformally formed on the surface, the sidewalls and the inclined plane 107S of the waveguide 107. In some embodiments, the composition of the mirror coating material layer 108 may be a metal such as aluminum (Al), silver (Ag), or a dispersed Bragg reflector (DBR) coating material. The thickness of the mirror coating material layer 108 is, for example, about 100 angstroms (Å) to about 10000 Å. Then, still in step S109, a mask 170 such as a patterned photoresist or a hard mask is formed on the mirror coating material layer 108. As shown in the plan view, the mask 170 covers a portion of the mirror coating material layer 108 located in the region of the inclined plane 107S. Another portion of the mirror coating material layer 108 located outside the inclined plane 107S is exposed.

Next, still referring to FIG. 5, in step S111, an etching process is performed to remove the mirror coating material layer 108 outside the inclined plane 107S to form a mirror coating layer 109. Thereafter, a stripping process is used to remove the mask 170. The mirror coating layer 109 is conformally formed on the inclined plane 107S. In addition, in some embodiments, the mirror coating layer 109 may also cover a portion of the sidewalls of the waveguide 107 abutting the inclined plane 107S.

Figure 6:
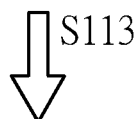
Figure 6:
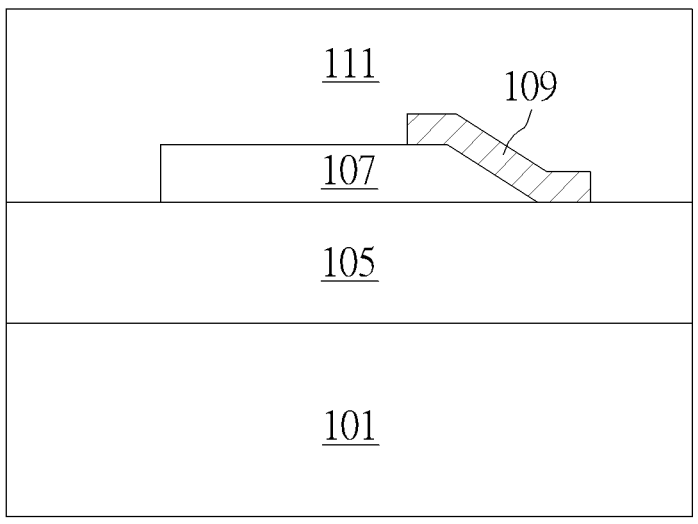
Figure 6:
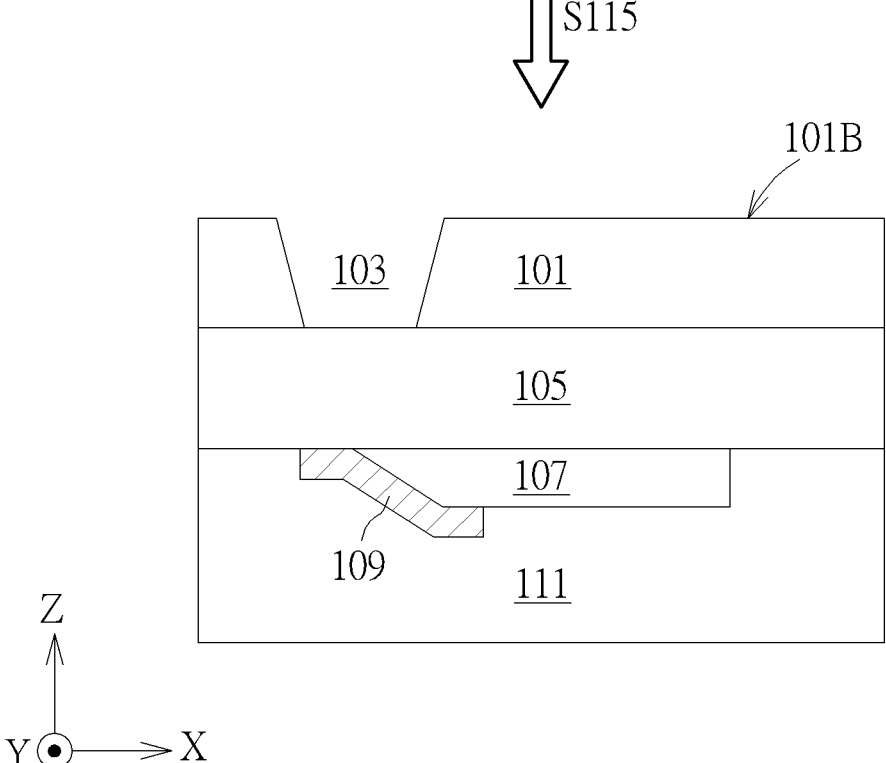

Afterwards, referring to FIG. 6, in step S113, a cladding layer 111 is formed on the insulating layer 105, and covers the waveguide 107 and the mirror coating layer 109. The cladding layer 111 is in contact with the insulating layer 105, so as to wrap around the waveguide 107 and the mirror coating layer 109. In some embodiments, the cladding layer 111 may be an inter-metal dielectric (IMD) layer, and the composition of the cladding layer 111 is, for example, silicon oxide.

Next, still referring to FIG. 6, in step S115, the structure in step S113 is turned upside down so that the back surface 101B of the semiconductor substrate 101 faces upward. Then, the back surface 101B of the semiconductor substrate 101 is etched by photolithography and etching processes to form a hole 103 in the semiconductor substrate 101. The position of the hole 103 vertically corresponds to the inclined plane 107S. The depth of the hole 103 is controlled by the etching process. In some embodiments, the bottom surface of the hole 103 may be located at the interface between the semiconductor substrate 101 and the insulating layer 105, so as to form a through substrate via hole (TSV)

penetrating the semiconductor substrate 101. Alternatively, the bottom surface of the hole 103 may be extended into the insulating layer 105. In another embodiment, the bottom surface of the hole 103 may be located in the semiconductor substrate 101, where a thin layer of the semiconductor substrate 101 is reserved between the bottom surface of the hole 103 and the insulating layer 105. The thickness of this thin layer does not affect an optical fiber 120 subsequently placed in the hole 103 to receive the reflected light from the mirror coating layer 109. Afterwards, as shown in FIG. 1, the optical fiber 120 is disposed in the hole 103 to complete the PIC structure 100.

Figure 7:
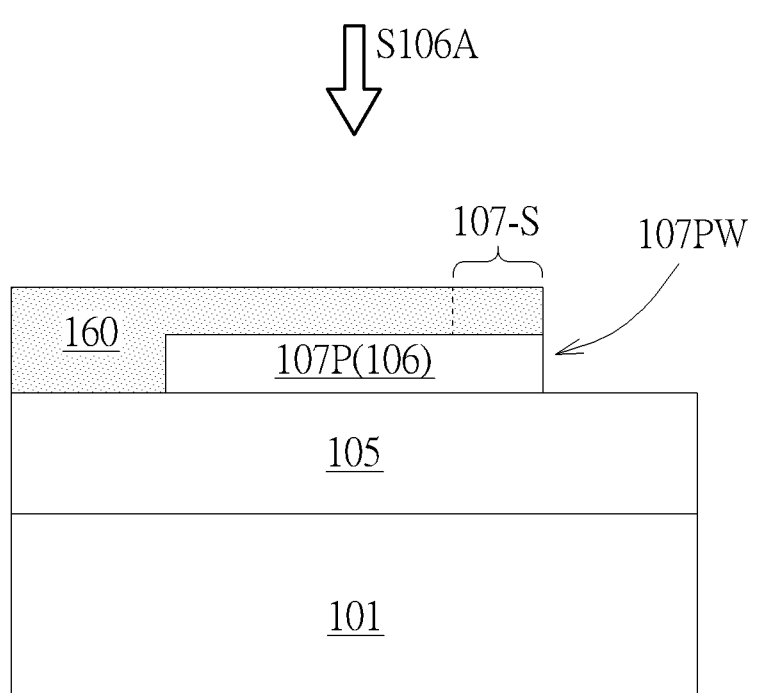
FIG. 7, FIG. 8, FIG. 9 and FIG. 10 are schematic cross-sectional views of some stages of methods of fabricating photonic integrated circuits according to some embodiments of the present disclosure.
Figure 7:
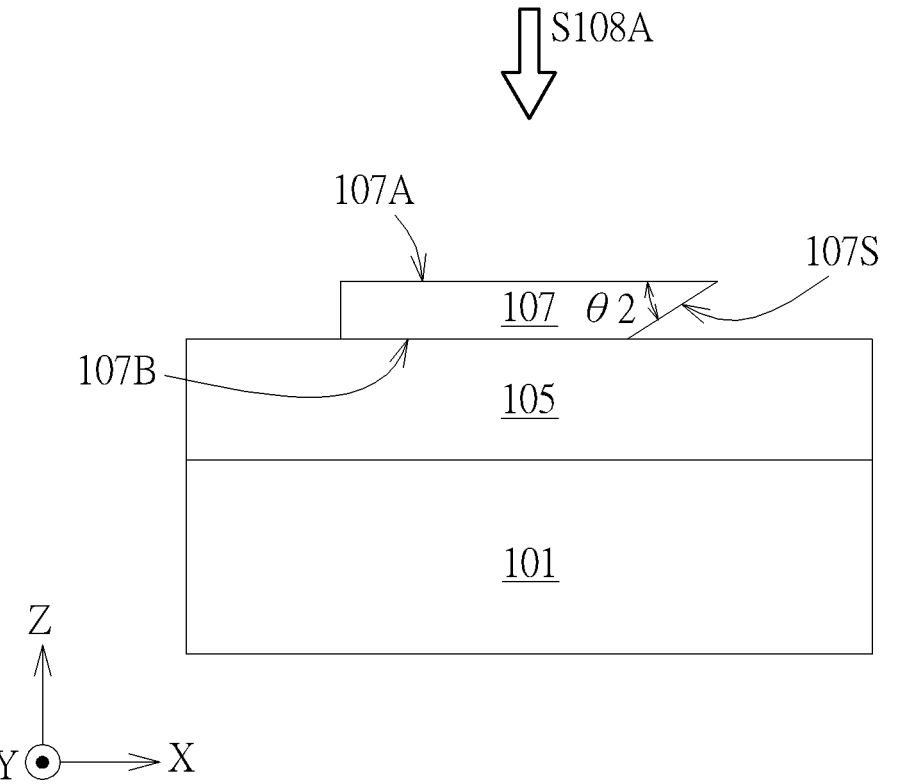

FIG. 7, FIG. 8, FIG. 9 and FIG. 10 are schematic cross-sectional views of some stages of methods of fabricating photonic integrated circuits according to some embodiments of the present disclosure. Referring to FIG. 7, in one embodiment, in step S106A, following the step S101 and the step S103 in FIG. 3, after the initial outline 107P of the waveguide is formed, in this embodiment, a mask 160 is formed on the insulating layer 105. The mask 160 is, for example, a patterned photoresist or a hard mask, which covers the initial outline 107P of the waveguide, and a sidewall 107PW of the initial outline 107P is exposed. The sidewall 107PW is located in a predetermined region 107P-S for a subsequently formed inclined plane.

Next, still referring to FIG. 7, in step S108A, an etching process is performed to laterally etch a lower portion of the initial outline 107P of the waveguide (also referred to as the waveguide material layer 106) in the predetermined region 107P-S to form an inclined plane 107S. An angle θ2 between the inclined plane 107S and the top surface 107A of the waveguide 107 may be greater than 0 degrees to about 45 degrees. Thereafter, a stripping process is used to remove the mask 160.

Figure 8:
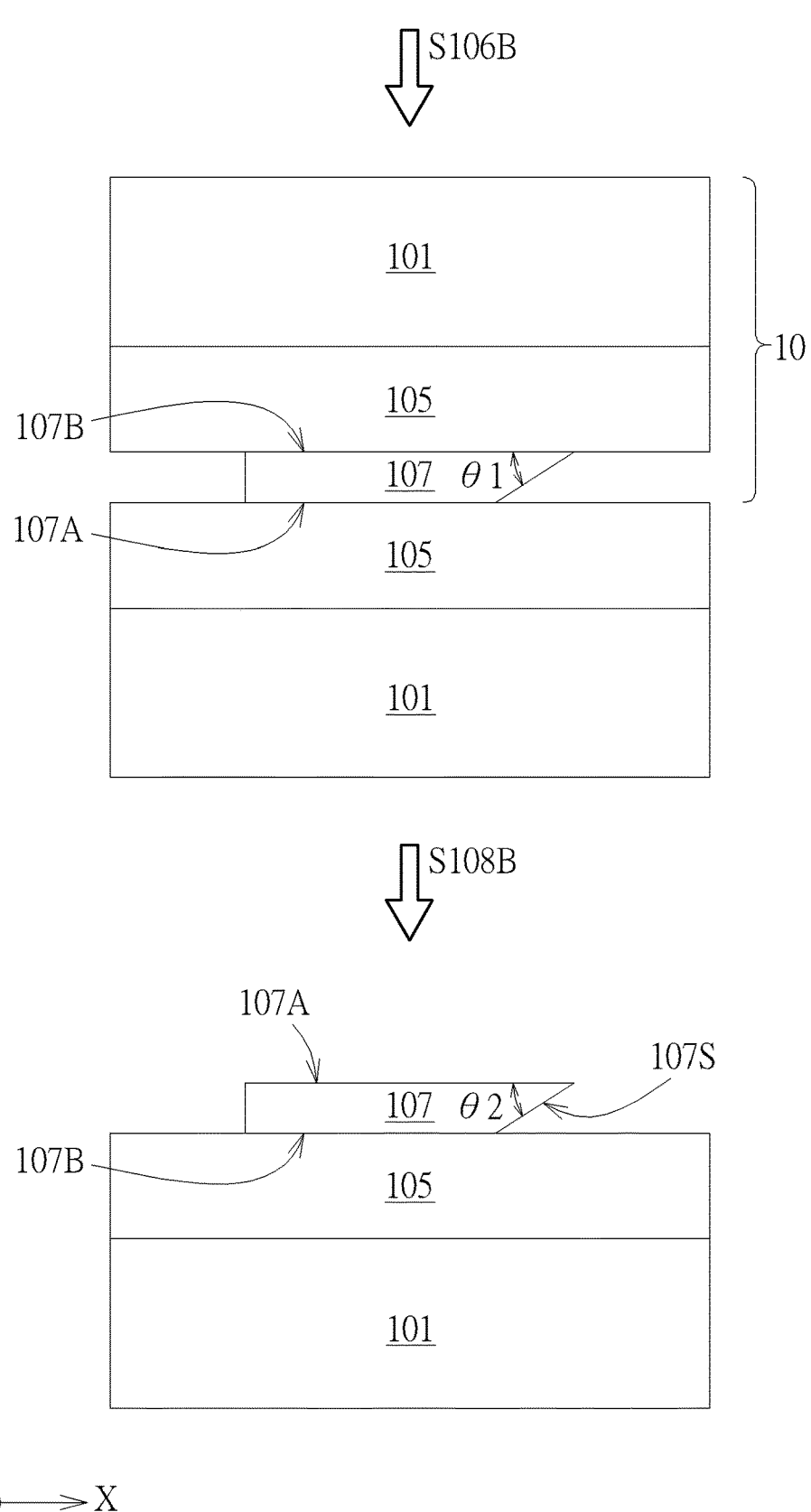

Referring to FIG. 8, in another embodiment, in step S106B, firstly, the inclined plane 107S of the waveguide 107 in the step S107 of FIG. 4 is formed, and then the cross-sectional structure 10 in the step S107 of FIG. 4 is turned upside down. Thereafter, the top surface 107A of the waveguide 107 in the step S107 is transferred and bonded to another semiconductor substrate 101 and another insulating layer 105 by a reverse bonding process. Next, in step S108B, the semiconductor substrate 101 and the insulating layer 105 of the cross-sectional structure 10 in the step S107 are separated from the waveguide 107, so that the top surface 107A of the waveguide 107 in the step S107 becomes the bottom surface 107B of the waveguide 107 in the step S108B, and the bottom surface 107B of the waveguide 107 in the step S107 becomes the top surface 107A of the waveguide 107 in the step S108B. In this embodiment, an angle θ2 between the top surface 107A of the waveguide 107 and the inclined plane 107S is the same as the angle θ1 in the step S107. Both the angle θ2 and the angle θ1 are greater than 0 degrees to about 45 degrees.

Figure 9:
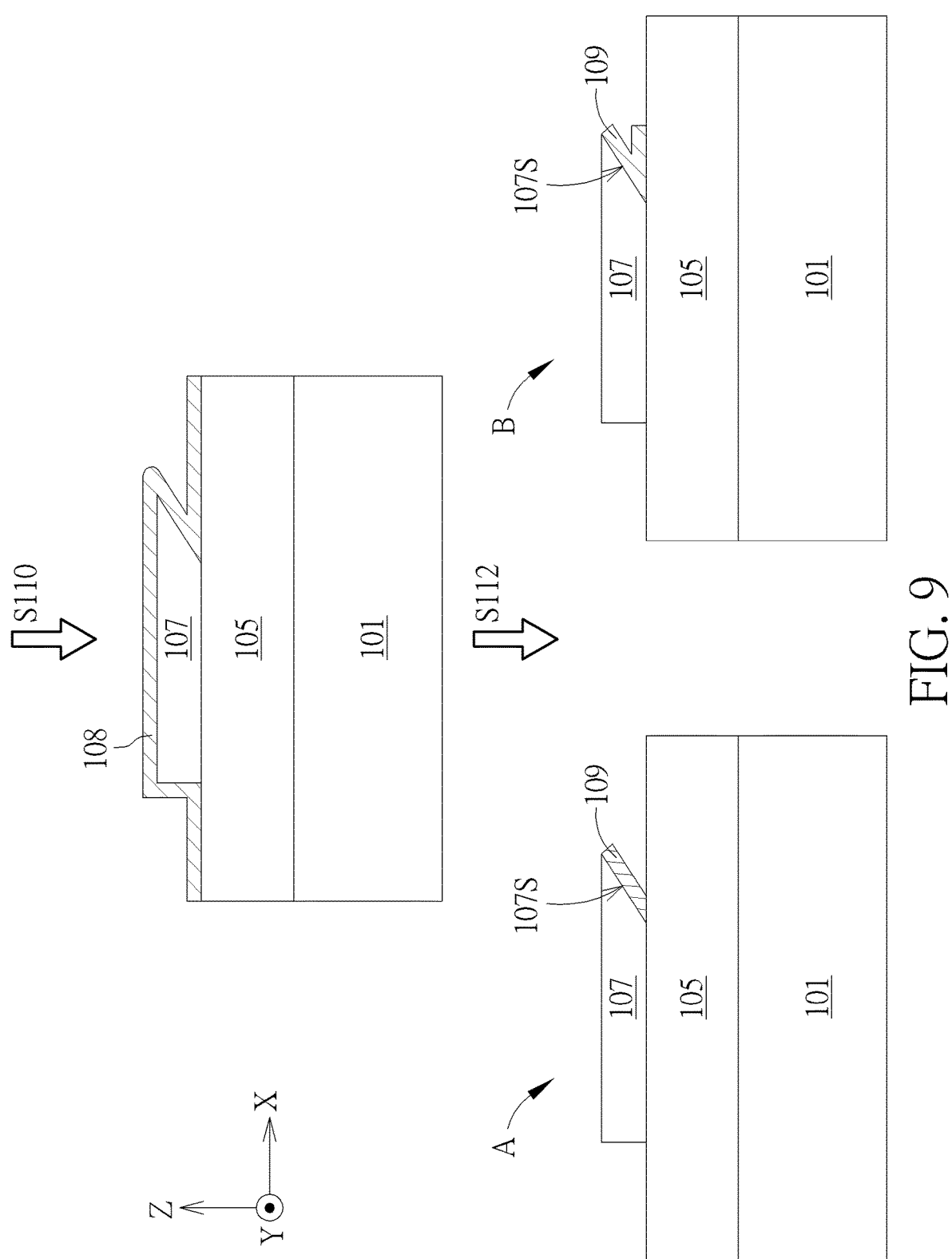

Afterwards, referring to FIG. 9, in step S110, a mirror coating material layer 108 is conformally deposited on the surface of the insulating layer 105, and on the surface, the sidewalls and the inclined plane 107S of the waveguide 107 by a chemical vapor deposition (CVD) process or a physical vapor deposition (PVD) process. Next, still referring to FIG. 9, in step S112, an etching process is performed to remove the mirror coating material layer 108 outside the inclined plane 107S to form a mirror coating layer 109. In one embodiment, in step S112, a mask (not shown) may be used to cover the surface of the waveguide 107, and the portion of the mirror coating material layer 108 on the surface of the insulating layer 105 is completely removed by a plasma etching process, so as to form the mirror coating layer 109 as shown in the cross-sectional structure A of FIG. 9. In another embodiment, in step S112, the inclined plane 107S of the waveguide 107 may be used as a mask, and the mirror coating material layer 108 outside the vertical projection area of the inclined plane 107S is removed by a plasma etching process, so as to form the mirror coating layer 109 as shown in the cross-sectional structure B of FIG. 9. In this embodiment, a portion of the mirror coating material layer 108 is remained on the surface of the insulating layer 105 in the vertical projection area of the inclined plane 107S to be a portion of the mirror coating layer 109.

Figure 10:
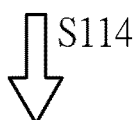
Figure 10:
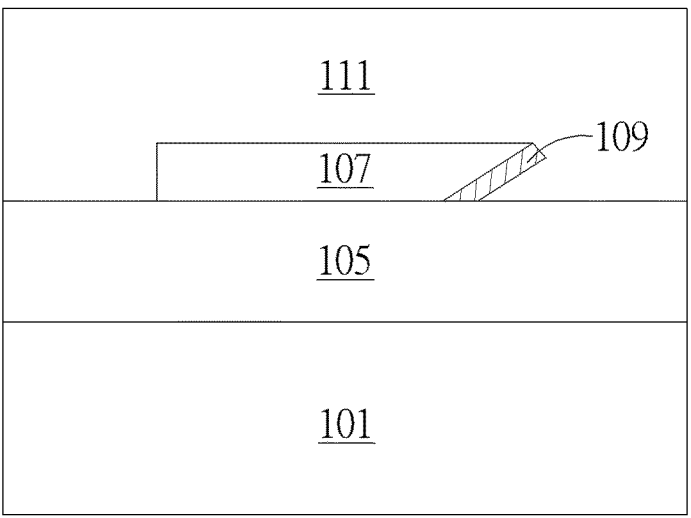
Figure 10:
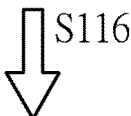
Figure 10:
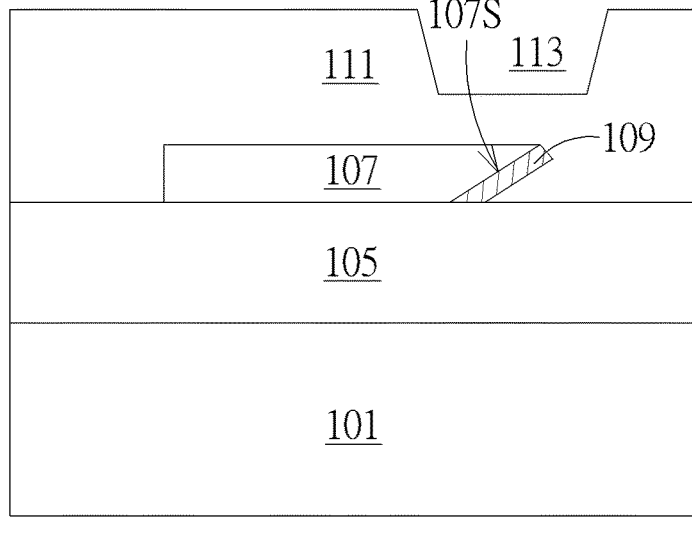

Afterwards, referring to FIG. 10, in step S114, a cladding layer 111 is formed on the insulating layer 105, and covers the waveguide 107 and the mirror coating layer 109. The cladding layer 111 is in contact with the insulating layer 105, so as to wrap around the waveguide 107 and the mirror coating layer 109. In some embodiments, the cladding layer 111 may be an inter-metal dielectric (IMD) layer and the composition of the cladding layer 111 is, for example, silicon oxide. Next, still referring to FIG. 10, in step S116, a hole 113 is formed in the cladding layer 111 by photolithography and etching processes. The position of the hole 113 vertically corresponds to the inclined plane 107S, and the bottom surface of the hole 113 is located in the cladding layer 111. There is a thin layer of the cladding layer 111 remained between the bottom surface of the hole 113 and the waveguide 107. The thickness of this thin layer does not affect an optical fiber 120 subsequently placed in the hole 113 to receive the reflected light from the mirror coating layer 109. Thereafter, as shown in FIG. 2, the optical fiber 120 is disposed in the hole 113 of the cladding layer 111 to complete the PIC structure 100.

According to some embodiments of the present disclosure, the PIC structures include a waveguide having an included plane at its end, and a mirror coating layer is disposed on the inclined surface to produce an inclined plane reflector. This inclined plane reflector can replace the grating coupler, so that the usable bandwidth is wider without wavelength dependence. Moreover, the optical fiber located in the hole of the semiconductor substrate or the cladding layer is precisely aligned with the inclined plane of the waveguide, thereby improving the optical coupling efficiency and reducing the optical loss. In addition, the angle of the inclined plane may be adjusted by the etching process according to the position of the optical fiber, so as to increase the optical coupling efficiency. Therefore, the photonic integrated circuits of the present disclosure provide higher transmission rate, larger amount of data transmission and better optical transmission quality. Furthermore, the size of the inclined plane at the end of the waveguide is much smaller than the size of the grating coupler, which is beneficial to the miniaturization of photonic integrated circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A photonic integrated circuit structure, comprising:
a semiconductor substrate;
a waveguide, disposed above the semiconductor substrate and having an inclined plane;
a mirror coating layer, conformally disposed on the inclined plane;

a cladding layer, covering the waveguide and the mirror coating layer;

an insulating layer, disposed between the semiconductor substrate and the waveguide, wherein the cladding layer is in contact with the insulating layer;

a hole, overlapping the inclined plane in a vertical direction; and an optical fiber, disposed in the hole to receive a reflected light from the mirror coating layer, wherein the cladding layer comprises an inter-metal dielectric layer, and the insulating layer comprises a buried oxide layer.

2. The photonic integrated circuit structure of claim 1, wherein the hole is disposed in the semiconductor substrate, and a bottom surface of the hole is located at an interface between the semiconductor substrate and the insulating layer, in the insulating layer or in the semiconductor substrate.

3. The photonic integrated circuit structure of claim 1, wherein the hole is disposed in the semiconductor substrate, the optical fiber is located directly below the mirror coating layer, a bottom surface of the waveguide is close to the semiconductor substrate, a top surface of the waveguide is away from the semiconductor substrate, and an angle between the inclined plane and the bottom surface of the waveguide is greater than 0 degrees to 45 degrees.

4. The photonic integrated circuit structure of claim 1, wherein the hole is disposed in the cladding layer, the optical fiber is located directly above the mirror coating layer, a bottom surface of the waveguide is close to the semiconductor substrate, and a top surface of the waveguide is away from the semiconductor substrate, and an angle between the inclined plane and the top surface of the waveguide is greater than 0 degrees to 45 degrees.

5. The photonic integrated circuit structure of claim 1, wherein the composition of the waveguide comprises silicon, silicon nitride, germanium or a group III-V compound semiconductor, and the composition of the semiconductor substrate comprises silicon, germanium or a group III-V compound semiconductor.

6. The photonic integrated circuit structure of claim 1, wherein the composition of the mirror coating layer comprises a metal or a distributed Bragg mirror coating material.

7. The photonic integrated circuit structure of claim 1, wherein when viewed from a top view, a width of the inclined plane is a same width as a width of a portion of the waveguide outside the inclined plane.

8. A method of fabricating a photonic integrated circuit, comprising:

providing a semiconductor substrate;

providing an insulating layer on the semiconductor substrate;

forming a waveguide above the semiconductor substrate, wherein the insulating layer is disposed between the semiconductor substrate and the waveguide, and the waveguide has an inclined plane;

conformally forming a mirror coating layer on the inclined plane;

forming a cladding layer to cover the waveguide and the mirror coating layer, wherein the cladding layer is in contact with the insulating layer;

forming a hole in the semiconductor substrate or the cladding layer, wherein the hole overlaps the inclined plane in a vertical direction; and providing an optical fiber to place in the hole to receive a reflected light from the mirror coating layer, wherein the cladding layer comprises an inter-metal dielectric layer, and the insulating layer comprises a buried oxide layer.

9. The method of claim 8, further comprising:

providing a waveguide material layer on the insulating layer.

10. The method of claim 9, wherein the hole is formed in the semiconductor substrate, and forming the waveguide having the inclined plane comprises:

patterning the waveguide material layer to form an initial outline of the waveguide;

using a mask to cover a portion of the initial outline and expose a predetermined region of the inclined plane; and etching an upper portion of the waveguide material layer located in the predetermined region to form the inclined plane, wherein a bottom surface of the waveguide is close to the semiconductor substrate, a top surface of the waveguide is away from the semiconductor substrate, and an angle between the inclined plane and the bottom surface of the waveguide is greater than 0 degrees to 45 degrees.

11. The method of claim 10, wherein forming the mirror coating layer comprises:

conformally depositing a mirror coating material layer on a surface, sidewalls and the inclined plane of the waveguide;

using a mask to cover the inclined plane and expose a portion of the mirror coating material layer outside the inclined plane; and removing the portion of the mirror coating material layer by etching to form the mirror coating layer.

12. The method of claim 9, wherein before forming the hole in the semiconductor substrate, the cladding layer is formed in contact with the insulating layer.

13. The method of claim 9, wherein forming the hole in the semiconductor substrate comprises etching from a back surface of the semiconductor substrate until an interface between the semiconductor substrate and the insulating layer, until into the insulating layer or stop in the semiconductor substrate.

14. The method of claim 9, wherein the hole is formed in the cladding layer, and forming the waveguide having the inclined plane comprises:

patterning the waveguide material layer to form an initial outline of the waveguide, wherein the initial outline comprises a predetermined region of the inclined plane;

using a mask to cover the initial outline of the waveguide and expose a sidewall of the initial outline of the waveguide located in the predetermined region; and laterally etching a lower portion of the waveguide material layer located in the predetermined region to form the inclined plane, wherein a bottom surface of the waveguide is close to the semiconductor substrate, a top surface of the waveguide is away from the semiconductor substrate, and an angle between the inclined plane and the top surface of the waveguide is greater than 0 degrees to 45 degrees.

15. The method of claim 14, wherein forming the mirror coating layer comprises:

conformally depositing a mirror coating material layer on a surface, sidewalls and the inclined plane of the waveguide; and removing a portion of the mirror coating material layer outside the inclined plane by etching to form the mirror coating layer.

16. The method of claim 8, wherein the hole is formed in the cladding layer, and forming the waveguide having the inclined plane comprises:

forming the waveguide above another semiconductor substrate and having the inclined plane, wherein a bottom surface of the waveguide is close to the another semiconductor substrate, a top surface of the waveguide is far away from the another semiconductor substrate, and an angle between the inclined plane and the bottom surface of the waveguide is greater than 0 degrees to 45 degrees;

bonding the top surface of the waveguide to the semiconductor substrate; and separating the another semiconductor substrate from the waveguide.

17. The method of claim 8, wherein the composition of the waveguide material layer comprises silicon, silicon nitride, germanium or a group III-V compound semiconductor, and the composition of the semiconductor substrate comprises silicon, germanium or a group III-V compound semiconductor.

\* \* \* \* \*